US009817602B2

(12) United States Patent
Chaw et al.

(10) Patent No.: US 9,817,602 B2
(45) Date of Patent: Nov. 14, 2017

(54) NON-VOLATILE BUFFERING FOR DEDUPLICATION

(71) Applicant: VIOLIN MEMORY INC., Santa Clara, CA (US)

(72) Inventors: David Chaw, Mountain View, CA (US); Angel Aviles, San Jose, CA (US)

(73) Assignee: VIOLIN SYSTEMS LLC, San Jose, CA (US)

( * ) Notice: Subject to any disclaimer, the term of this patent is extended or adjusted under 35 U.S.C. 154(b) by 0 days.

(21) Appl. No.: 14/938,238

(22) Filed: Nov. 11, 2015

(65) Prior Publication Data

US 2016/0139849 A1  May 19, 2016

Related U.S. Application Data

(60) Provisional application No. 62/079,194, filed on Nov. 13, 2014.

(51) Int. Cl.
| G06F 12/00 | (2006.01) |
| G06F 13/00 | (2006.01) |
| G06F 13/28 | (2006.01) |
| G06F 3/06 | (2006.01) |

(52) U.S. Cl.
CPC .......... *G06F 3/0641* (2013.01); *G06F 3/0611* (2013.01); *G06F 3/0656* (2013.01); *G06F 3/0688* (2013.01)

(58) Field of Classification Search
CPC .... G06F 3/0611; G06F 3/0641; G06F 3/0656; G06F 3/0688; G06F 9/00

USPC ........................................................ 711/119
See application file for complete search history.

(56) References Cited

U.S. PATENT DOCUMENTS

| 4,774,706 A * | 9/1988 | Adams .................... H04L 12/64 370/465 |
| 6,650,640 B1 * | 11/2003 | Muller .................... H04L 49/90 370/392 |
| 7,304,996 B1 * | 12/2007 | Swenson ............. H04L 45/7453 370/229 |
| 7,613,209 B1 * | 11/2009 | Nguyen .................. H04L 47/10 370/474 |
| 8,036,124 B1 * | 10/2011 | Motwani ................. H04L 47/30 370/230 |
| 8,411,574 B2 * | 4/2013 | Liu ....................... H04L 49/253 370/230 |

(Continued)

*Primary Examiner* — Sheng-Jen Tsai
(74) *Attorney, Agent, or Firm* — Brinks Gilson & Lione (57) ABSTRACT

A system and method for storage of data is described where the data and commands received by a storage system is processed using at least a pair of redundant channels, configured so that received data buffered in a first channel is also buffered by a second channel prior to acknowledgement of the completion of the command execution. This permits a low latency of response to commands while securely storing the data. Data that is buffered in the first channel may be processed for storage, or for deduplication or compression prior to sending to the storage system subsequent to the acknowledgement of completion of the command and the data may then be purged from the data buffers in the redundant channels. A file identified as being smaller in size than the size allocated to associated metadata may be stored as part of the metadata without being sent to the storage system.

15 Claims, 4 Drawing Sheets

(56) References Cited

U.S. PATENT DOCUMENTS

| | | | |
|---|---|---|---|
| 2002/0141423 A1* | 10/2002 | Namihira | H04L 12/5693 370/411 |
| 2006/0187837 A1* | 8/2006 | Warren | H04L 49/357 370/235 |
| 2006/0253731 A1* | 11/2006 | Petruzzo | G06F 11/1456 714/6.2 |
| 2006/0259723 A1* | 11/2006 | Petruzzo | G06F 11/2082 711/162 |
| 2007/0162610 A1* | 7/2007 | Un | H04L 1/0041 709/230 |
| 2008/0008202 A1* | 1/2008 | Terrell | H04L 12/5693 370/401 |
| 2008/0101411 A1* | 5/2008 | Takahashi | H04L 1/1896 370/473 |
| 2010/0091770 A1* | 4/2010 | Ishikawa | H04L 47/20 370/389 |
| 2011/0276771 A1* | 11/2011 | Tajima | G06F 3/061 711/162 |
| 2012/0239172 A1* | 9/2012 | Nishiyama | G05B 19/05 700/86 |
| 2015/0208449 A1* | 7/2015 | Sato | H04W 24/02 370/329 |
| 2015/0347226 A1* | 12/2015 | Pawlowski | H04L 47/12 714/749 |
| 2015/0370586 A1* | 12/2015 | Cooper | G06F 9/45533 710/308 |
| 2016/0261512 A1* | 9/2016 | Lautenschlaeger | H04L 41/0631 |

* cited by examiner

NON-VOLATILE BUFFERING FOR DEDUPLICATION

The present application claims priority to U.S. provisional application Ser. No. 62/079,194, filed on Nov. 13, 2014, which is incorporated herein in its entirety.

TECHNICAL FIELD

The subject matter of the present application may be related to data storage systems.

BACKGROUND

A common architecture for enterprise computing systems includes a client computer and a storage system, where the client system performed most of the computational intensive tasks using applications programs and the information needed for the computation was retrieved from a storage system. Often the storage system was not directly attached to the computer. The connection between the two system components depended on the data storage concept and was often described as a SAN (storage attached network) where data was stored as fixed sized blocks and as a NAS (network attached storage) where data was stored as files.

The storage component has been typically comprised of a server computer and a plurality of hard disk drives for the actual data storage. Files are often used for unstructured data such as images, text and the like whereas block storage has been associated with, for example, database processing. In all of these applications, the response time of the storage component of a computing system has been limited by the mechanical performance of the associated disk drives. Mixed workloads, a combination of block and file applications, were avoided due to unfavorable interactions between the access requirements.

Flash memory arrays are replacing disk storage devices in many applications due to the more rapid response time to client requests for reading and writing data as well as a capability to perform a much higher number of input/output (I/O) operations per second. However, at present, the hardware cost of the flash memory is greater than that of disk and the flash memory is perceived to have a wear out problem, at least if not properly managed. The amount of data to be stored on a global basis appears to grow substantially, despite all efforts to restrict this growth, and more efficient data storage techniques have been developed using techniques such as data de-duplication and compression. With disk storage systems, post-storage deduplication may be performed; the data to be written to the storage device is usually first written to a disk and subsequently de-duplicated so as to optimize disk performance. Often the deduplication is not performed until the data is backed up; the process is costly both computationally and in terms of volatile metadata storage. The wear-out characteristics of flash memory have led to the performance of these data reduction techniques in-line in order to reduce the amount of data that is actually stored.

Data de-duplication is effective for certain application types such as email attachments, operating system or virtual desktop images and the like, and is usually less effective for data base information. Similarly, data compression is effective for images, text files and the like, but relatively ineffective for encrypted or already compressed data.

System architecture is also influenced by the virtualization of computing systems, where server computers are being configured to support the effectively simultaneous operation of a plurality of application programs, each with its own allocation of computing and memory resources. This trend results in a fragmentation of the temporal pattern of storage operations as the independent storage system requests from the application programs are contemporaneously presented to the storage devices from a plurality of using applications.

Figure 1:
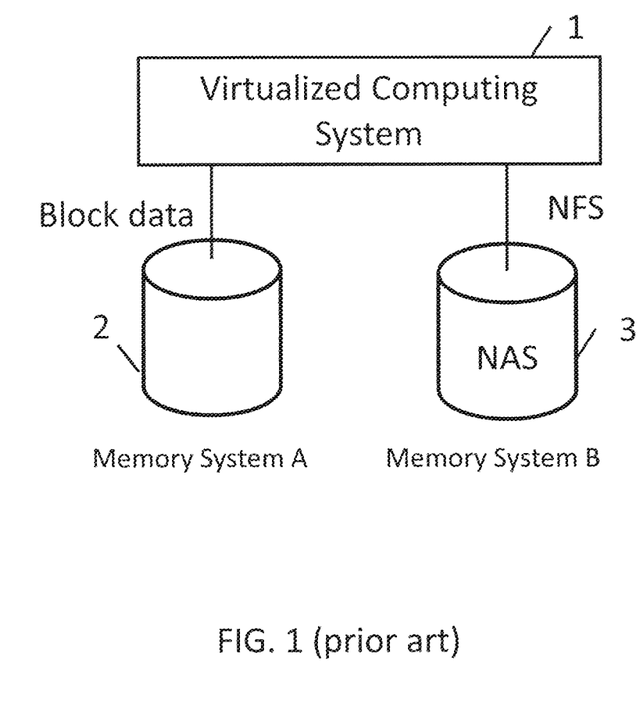
FIG. 1 (prior art) is a block diagram of a virtualized computer system which may service users having requirements for block storage and file storage.

FIG. 1 (prior art) shows a top level block diagram of a virtualized computing system 1 configured to service guests (users) or applications representing mixed data storage requirements. That is, some of the guests may store data as files using block storage and communicating with a memory system 2 through a SAN network that supports an appropriate communications protocol. Guests that store data using a file-oriented approach such as NFS may communicate with memory system 3 through a NAS network that supports an appropriate communications protocol. Other protocols communications and file access may be used and are often proprietary to a vendor and have differing levels of functionality.

Converged storage architectures are being developed that support virtualized users having a mixture of block and file-based storage requirements either individually or collectively. The server and flash memory array may therefore need to provide the storage required for both types of data, depending on the application programs, while maintaining the consistently low latency and high-I/O-rate capability that are the salient requirements of the evolving data storage systems.

SUMMARY

A data storage system and method is disclosed, having a plurality of non-volatile buffer memories, each buffer memory communicating with an external communications interface. At least a pair of non-volatile memories are in mutual communication and are located individually in a redundant hardware configuration. Each combination of a buffer memory and a processor may be termed a data channel of the redundant data channels. The processor is configured to receive information over a network from a user and to initially store the data in the non-volatile memory of the receiving channel. While the physical receipt of the data may be acknowledged as part of the communications channel protocol, the action associated with the received data or command is not acknowledged until the data has been effectively or actually securely stored in an associated memory system.

However, when the data received by a first channel of a pair of redundant data channels is sent to and also stored in the non-volatile memory of the second channel and the receipt thereof is acknowledged to the first channel, the received data may be considered to have been securely stored in the target storage system in accordance with the associated command, even if the actual storage occurs at a later time. The execution of the command may be acknowledged to the user by the first channel although all operations for the storage of the acknowledged data have not as yet been completed.

The buffered data may be processed for storage in the non-volatile storage memory subsequent to acknowledgement of the effective completion of the command to the user, thus reducing the apparent latency of operations such as deduplication or compression. Where the properties of the file, which may include identification of the user, indicate that deduplication is an operation to be performed, the data is dequeued from the non-volatile buffer and processed by a deduplication algorithm. After determining whether the data in a particular chunk of data is unique or has already been stored, the unique data is stored in the storage system or the metadata of the deduplication process is updated to reference the chunk of data. When has been performed, the data may be deleted (purged) from the channel buffer and the backup buffer in the channel pair where the data was temporarily stored.

Where initial processing of the data, the file identifier or metadata indicates that the file is smaller than the size allocated for the associated metadata, the file may be stored as part of the metadata and not stored in the storage system. This processing path is useful for files that are procedural in nature such as a *lck file and which typically have short lifetimes. When a file type to be stored as metadata is identified, the completion of the command to store the file may be considered as either the completion of the updating of the metadata or the storage of the data in the non-volatile memory of the second of the data channels, whichever of the two processes is chosen.

DETAILED DESCRIPTION

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific or custom-designed hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have a capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the claimed invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); non-volatile RAM (NVRAM); phase change memory (PCM), resistive RAM (ReRAM), programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like, which exist or may be developed to perform equivalent functions. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

When a memory system is being used to store data, the reliability of the data storage is an important consideration and redundancy in one form or another is provided in enterprise data processing systems. Duplication of the data by performing backups, or snapshots, supplements intrinsic error correction algorithms and may use a technique such as RAID to cope with storage module failures at various levels in the storage system. Until the command and any data sent by the user (client) is stored in a non-volatile and redundant manner, the storage system may not acknowledge the command. The secure (reliable) storage of data may be when the data is actually resident in the non-volatile storage medium, or temporarily stored such that the data is storable to such a medium without loss in the event of a power failure, shutdown, software failure or other similar event. The term "secure" in this context refers to the certainty that the stored data will not be lost in the case of a power failure, hardware failure, software error or unexpected system shutdown. At a minimum, at least one of the two or more instances of the data needs to be stored in a non-volatile medium (e.g., NVRAM) that is readable in the event of a failure in the channel currently processing the data. The metadata needed to locate and maintain the stored data needs to be reliably stored as well; however except in passing, we do not discuss this process. The non-volatile buffer used for backup may be a separate memory element or may be a partition of the memory used to buffer the input data of each channel, where the partition is reserved for the storage of data from the other channel.

This requirement for secure storage guards against a failure of the storage system resulting in irretrievable loss of user data occurring between the time that the data has been received by the storage system and the time that is protected from loss by the non-volatile storage of the information and the associated error detection and correction techniques.

Low latency, consistent latency and high throughput for both read and write operations are important attributes of modern storage systems. Latency may be described as the time delay between the issuance of a user request for some action by the server and the acknowledgement by the server that the user request has been completed. The user will expect that such an acknowledgement for write operations will not be sent until the data has been securely stored. Securely stored data is protected from loss due to a hardware failure by techniques such as using a Redundant Array of Inexpensive "Disks" (RAID), mirroring or other replication or distributed data storage, either alone in combination, depending on the system reliability or failure recovery requirements.

The execution of a using program is often suspended until such an acknowledgement has been received by the client. Consequently the speed of the response (the latency) is an important factor in storage system performance. Similarly, the consistency of the latency may be a factor in user program performance, as a step in a using program may require reading data from multiple locations in the storage system prior to performing further processing. Variable latency can lead to significant performance reduction for the using application where a plurality of read operations or write operations to the storage system is necessary to complete a program step.

Latency has an effect both on reading data and on writing data, as a delay in acknowledging data that is to be written may necessitate retaining a copy of the data by the user until the acknowledgment is received, and this may result in either more buffer space required or a queuing of program requests.

Portions of files or entire files may be written to the storage system, and such files may be quite large, exceeding 20 MB, for example. The transmission protocols and transport media between the client and the server may result in segmenting the files into fixed or variable length portions and, in a virtualized system, the file segments of a plurality of users may be interleaved.

A storage system that is data type agnostic needs to process a heterogeneous stream of data while maintaining consistent performance. In an application where a plurality of users, including virtualized users operate independently of each other, the short term mix of data types may vary. Block data, which may be of high or low entropy and file data may be interleaved at the input to the storage system. Some portions of the data may be suitable for deduplication and compression, while other portions of the data may be not be deduplicatable or compressible. The input data processing may therefore have dynamically variable requirements for processor capability, data transfer capability and buffer storage capability.

Maintaining constant performance at the interface between the storage system and the plurality of users may involve identifying the characteristics of the received data and commands on a granular basis. The discussion herein focuses on the write process. Where the data is in an input buffer when a read operation is received, the request may be serviced from the input buffer acting as a cache. Multiple write operations to a particular file or logical address may also result in processing the data in the input buffer so as to eliminate obsolete data.

Figure 2:
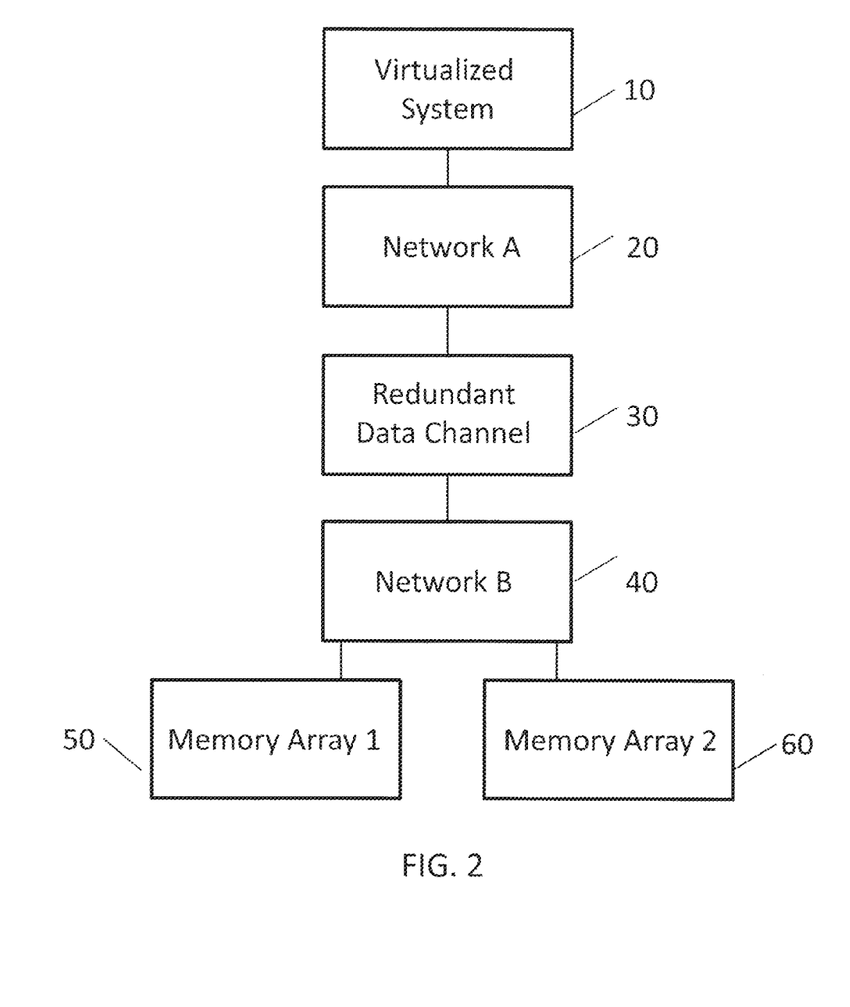
FIG. 2 is a block diagram of a virtualized computer system where a network connects the user to a redundant data channel, which may at as a gateway to a plurality of memory arrays.

The types of failure that may typically be considered in system design include loss of power, failure of a component, or a software crash. An example of a system architecture that is effective in protecting against data loss while consistent low latency acknowledgment in response to user commands to write data is shown in FIG. 2. The virtualized users 10 may communicate with a redundant data channel 30 through a network 20 that either supports both SAN and NAS protocols, or is partitioned into SAN and NAS networks having redundant interfaces to the data channels. The redundant data channel 30 may perform data processing functions on the payloads and commands received from the virtualized environment 10 over the network 20. The redundant data channel 30 may also be known as a gateway or some other term as the front end of the storage media 50, 60. The virtualized environment may be a plurality of such environment sharing the storage system 80.

A redundant channel 30 may be referred to as an active-active controller where each channel is equally capable of processing user requests. Alternatively the redundant channel may be a passive channel that is capable of automatically assuming the function of an active channel in the event of a failure of the currently active channel. The passive channel has an role at all times as a NVRAM buffer in the channel is used to temporarily store a copy of data that has been received by the active channel, acknowledged to the user, but no as yet securely stored to the memory system.

The channels are usually provided with redundant power supplies and configured to avoid a single point of failure for both channels. The physical architecture is designed to provide for servicing of each channel independently of the other channel.

The network 40 between the redundant storage channel 30 and the storage media 50, 60 may be any conventional network approach, but may also be a specific design that compliments the requirements of the gateway and the storage media. Consequently the network 40 may be located in a same chassis as the gateway or storage media, be located in a same rack, or located separately, and possibly remotely, depending on the latency, reliability and restoral requirements of the specific system design.

A plurality of protocols and implementations of the components of the network 20, disposed between the storage system and the users may be used, and a variety of such implementations may be used simultaneously depending upon the using system design, operating system, and user programs that are to be supported by the storage system. User program interface requirements may be satisfied by, for example, Application Programming Interfaces (API). In effect, the API is a published protocol interface to a proprietary software system that the user program may request services, processing and the like in a standardized manner. Such APIs translate user parameters and requests into the appropriate format for execution by the software system. Such requests may be the result of inputs through a graphical user interface (GUI) to access a data base system, to control the configuration of a storage system, or the like.

Data transfer protocols such as SCSI, Fibre Channel, Ethernet may be used simultaneously depending on the specific interface configuration provided for the storage system data channel 30. Individual interface adapters may be user or a converged network adapter (CNA) which a single network interface card (NIC) that contains both a Fibre Channel (FC) host bus adapter (HBA) and a TCP/IP Ethernet NIC connecting servers to FC-based storage area networks (SANs) and Ethernet-based local area networks (LANs).

The identification of particular data protocols and interfaces is intended to be by way of example and not as a limitation. PCIe interfaces of various configurations may be used, and new data protocols and interfaces are under continuing development. Any of such data and control interfaces may be effectively employed in this system. It should be understood that the plurality of protocols and communication channel implementations is a manifestation of the current state of evolution of the computer and storage industry and other protocols and communications channels and protocols may be used or may be developed in the future so as to provide connectivity between the user application and the means for storing the data of the user.

A plurality of memory arrays 50, 60 may communicate with the data channel 30 through another network 40, which may be, for example, a redundant switched Fibre Channel (FC) protocol, local area network (LAN), PCIe switched fabric, or the like. Although the figures may show connections between modules or devices as a single-line diagram, a person of skill in the art would appreciate that these connections are generally redundant, so that no single component or connection failure would cause a failure of the system to perform any storage operation requested by the virtualized system 10. The virtualized system 10 is intended to represent a plurality of users, whether embodied in a single using system or a plurality of using systems and which may be either remote from the storage system 10, collocated with the storage system 10 or integrated with the storage system 10. Any combination local and remotely located users may be serviced by the storage system 10, taking account of network bandwidth and latency as part of the overall system design.

Figure 3:
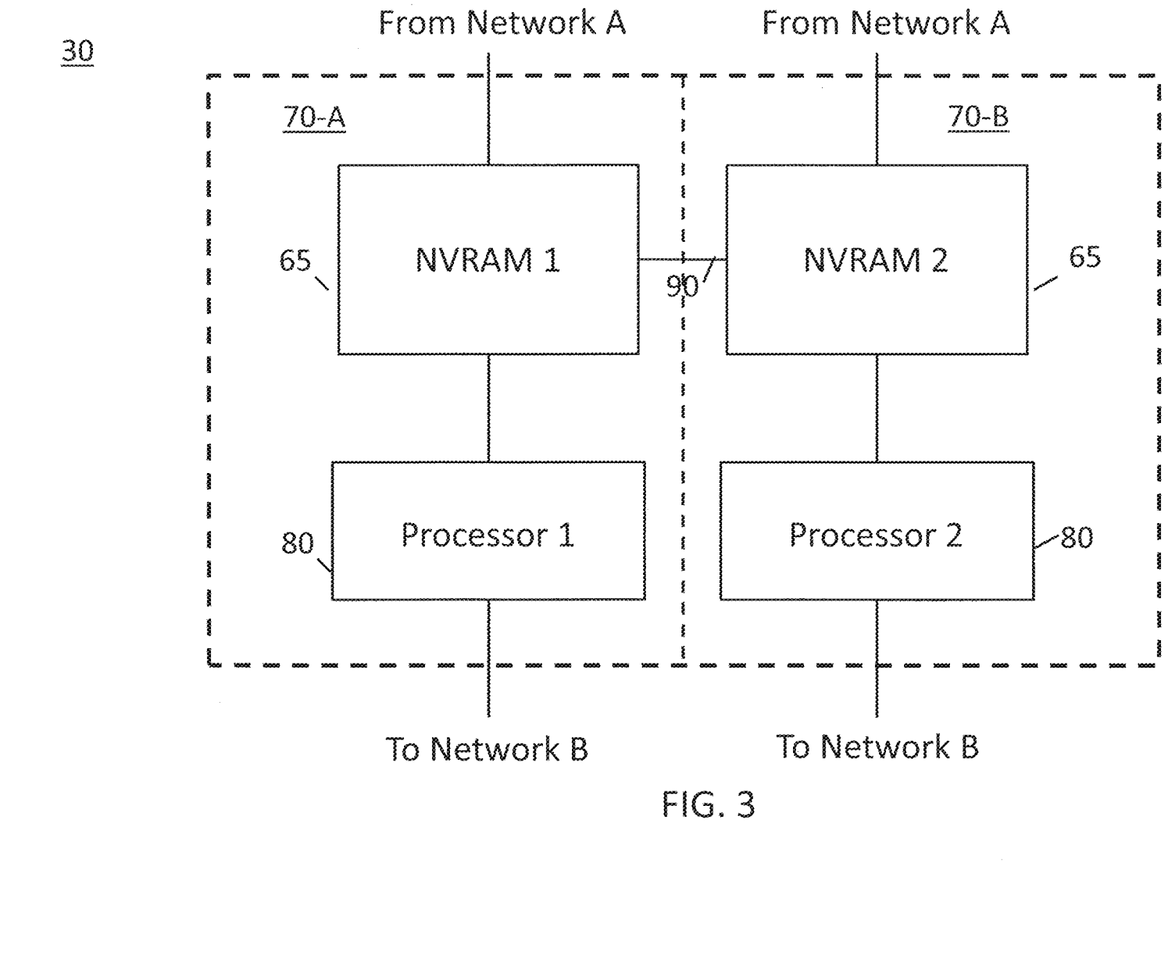
FIG. 3 is a block diagram of the redundant data channel of FIG. 3 showing a communications channel between non-volatile memories located in each of the channels; and, FIG. 4 is a flow chart of the process of deduplicating data of a file received by a data channel.

The redundant data channel 30, shown in FIG. 2 may be formed by using, for example, two equally-capable data processing channels 70-A and 70-B as shown in FIG. 3, and providing sufficient redundant interconnections between the channels (not all may be shown) to route around a failed component and to provide functional communication between the channels as further described herein. Virtualized users may communicate with the data processing channels 70-A,-B through a redundant network 20, which may include switches or routers, and the processing channels 70-A and 70-B may communicate with one or more memory arrays 50, 60 through a redundant switch or network 40 or other network. The memory arrays 50, 60 may also have similar redundant capabilities including redundant controllers, power supply modules, fans and the like, as well as data recovery means such as RAID. For longer-term data protection, the traditional backup methods, such as hard disk (HDD), tape, off-site mirroring or the like may be used.

The embodiment described is that of an active-active configuration, with occasional comments with regard to differences between an active-active configuration and an active-passive configuration.

Each of the processing channels may have an input buffer memory 65 comprising a non-volatile random access memory (NVRAM) and a controller 80 as well as ancillary memories, buffers, interfaces and the like (which are not shown). NVRAM may be any memory type that retains data in the event of an interruption of power, the data path, or the execution of other processes by the system. This may include, battery-backed RAM, with or without a flash memory or traditional rotating-media hard disk to which the data can be rapidly stored, flash memory, phase change memory, cross-point memory, reRAM or other future memories such as cross-point having similar characteristics. Describing the memory as being NVRAM is not intended to limit the memory technology, but rather to suggest that suitable memories are non-volatile.

Each channel may have one or more external interfaces communicating with the user, which may be virtualized, through the network 20, which may be, for example, but not by way of limitation, Fibre Channel (FC), iSCSI, Ethernet, PCIe or the like, may communicate with memory arrays 50, 60 through FC, PCIe or other high speed devices and be routed to the desired memory array by the network 40. Additionally a redundant high-speed bi-directional interface 90 may connect the two processing channels 70-A, 70-B. The combination of the gateway 30, the network 40 and a plurality of memory arrays, 50, 60 may collectively be considered to be a storage server 90.

Data and commands received by each channel of the gateway needs to be securely stored prior to acknowledgment to the user by the storage system. Each data transport mechanism and protocol may have different acknowledgement requirements. To avoid confusions, the type of acknowledgement meant here is at a level in the software stack where the apparent execution of the user initiated command is acknowledged. Low level handshaking and data transmission error recovery is presumed to occur without involving the user application except in the case of a fault.

The received data (and commands) is stored in a non-volatile memory (NVM) input buffer upon receipt, and a copy of the received data is sent to the other channel over a data like so as to be stored a NVM backup buffer. Each channel has the same configuration and so provides a backup buffer for the other channel. The purpose of the backup buffer is to provide a copy of the data received by the other data channel so that a complete failure of the other channel does not result in the loss of any data whose status is that of having been securely stored.

So, until the receipt of the data by the backup buffer has been acknowledged to the other channel, the receiving channel does not respond with a success message to the using system. However, once that acknowledgement is provided, the system described herein has securely stored to receive data and the using application may continue to execute.

As the purpose of the backup buffer is to provide for redundant storage of the received data and commands, no further processing of the data or commands is performed on the data in the backup buffer, except in the case of a fault. Management of the data in the backup buffer is further described below.

Commands and data are received at the input buffer memory 65 and as soon as the data is mirrored to the other processing channel (70-A, 70-B) the receipt of the data is acknowledged to the user. In effect, the data has been committed to secure storage, and the user may proceed with other operations. The user wait time (latency) is minimal, and the processing channel does not have to maintain state with respect to the user, as the received information has been securely stored, and that this security of the data is maintained thereafter. For a read command, the time to retrieve the data from the memory media 50, 60 comprises the latency. Where the data in a read command may be found in the input buffer, the request is serviced from the input buffer as a cache. Although the present examples refer to a virtualized user, this is not a limitation. The apparatus and method described herein is equally applicable to a plurality of client devices sharing a memory system or a single client. As the typical communications protocols between the clients and the server are stateless, clients may encounter delays due to the time needed to execute the processing steps of the data processing channel 30 so that a write command, for example can be acknowledged promptly as provided herein. However, the data processing channel may also be configured to service stateful protocols.

In an example, the input buffer memory 65 may be a NVRAM (non-volatile RAM) device comprising, for example, a volatile random access memory (e.g., DRAM) with a battery or supercapacitor to maintain the data for a period of time after a power failure, and a non-volatile memory such as a disk or a flash memory sufficient to store at least the contents of the volatile memory and where the energy capacity of the supercapacitor or battery is sufficient to permit this storage operation to be performed. Loss of power may be signaled to the NVRAM device by another component of the processing channel such as the processor 80, a voltage sensor or the like. Other precautions may include the use of watch-dog timers or other sensors to cause an orderly shutdown of the data storage operation.

Data or commands received, for example, by processing channel 70-A are immediately mirrored to processing channel 70-B so that even a failure of the NVRAM in channel A would not result in data loss. The mirrored data may be stored in the volatile or non-volatile memory depending on the system design, however the data is not expected to be used except in the case of a failure of the device (e.g., NVRAM, 65, processor 80) storing or processing the originally received data. Both channels may be active and use the other channel as a mirror for all "data". This would include commands, data itself and metadata of all types. Where the operation to be performed is a write operation, the act of storing the data in the NVRAM of channel 70-A and mirroring the data to channel 70-B may comprise secure storage of the data and the execution of the user request can be rapidly acknowledged once this is accomplished.

While further processing of the acknowledged data may be performed, for de-duplication, for compression, for other file management activities and for the maintenance of associated metadata, the user does not have to wait for these activities to complete before receiving an acknowledgement from the storage server 90. So, the typical wait period (latency) encountered in other system approaches for an acknowledgement of the storage of data may be avoided. A design objective may be to receive and acknowledge data, requests for operations, and the like at a rate limited only by that of the communications channel bandwidth between the user computing system and the redundant channel.

The controller 80 of each active channel may perform data processing functions such as data de-duplication and compression. Each of these functions requires computational and memory resources. System performance may be degraded if the controller 80 cannot keep pace with the stream of input data and commands. A better allocation of resources may be possible by selectively using the de-duplication and compression processes so that user applications where the reduction in data to be stored is likely to be greatest are subject to the appropriate processes. A determination of whether these processes are to be performed may be based on user selection of alternative states, or by the characteristics of the data itself using procedures or heuristics.

For example, but not by way of limitation, the processing of the received data may identify the received data as being block data or file data, and to further identify the data as being associated with a particular logical unit number (LUN) that has been previously configured and made known (exported) to the user. A storage system may provide for LUNs having particular characteristics (thick, thin, deduplicated, compressed, encrypted, RAID type, and the like). The data associated with each LUN may therefore require processing by different processes. Depending upon the specific combination of attributes, the data may be best processed in a near-real time or real time manner, or may be accumulated in a temporary buffer and then processed in a batch process. The data throughput requirements of a large storage system general require preforming even the batch processes frequently so as to manage the buffer sizes required. Where there is an infrequently occurring processing type, the data may be identified to be processed immediately, or be stored for a predetermined time, or until a sufficient amount of such data has been accumulated. But, since all of this data has been backed up in the backup buffer, there is no additional delay in acknowledging receipt to the user.

Each of the processes has a maximum throughput characteristic of the process itself; the throughput may also have some data dependent characteristics. A design objective would be to have each processing thread capable of running at a throughput consistent with emptying the input buffer of all data of that type on an average basis so as not to require throttling of the data input. In effect, when the storage system cannot process all of the data of a particular type within the storage capability of the input and backup buffers, the rate of receipt of the data from the user may need to be reduced below the channel bandwidth. This has the effect of increasing the latency of the storage system response.

Since the data received is expected to be heterogeneous and the data rate of each type of data depends on the needs of the external users, which may not be correlated, the time-dependent demands of the processing and buffering capability need to be accommodated.

In an example, the buffer may be managed as a single buffer, where all received data is considered to be 4 KB blocks. Depending on whether the destination LUN is a deduplicated or an undeduplicated LUN, each block is dequeued from the buffer in FIFO order and either a) processed by a deduplication process, or b) stored without deduplication. The size of each buffer is determined as a system configuration parameter. The rate of acceptance of input data may be regulated so that each of the buffers is maintained at less than a predetermined percentage occupancy. The data is dequeued from each buffer at the current processing rate of the associated thread. When the buffer reaches the predetermined occupancy, the input to the buffer is managed by restricting the input data rate based on LUN. Since each of the input data is parsed to determine the destination LUN and the appropriate buffer, the acknowledgement of the data can be delayed to slow the data rate, as an example.

As the data is dequeued from the each buffer, the head of the queue for the buffer may be maintained by a pointer. Even if the data has been dequeued, the data is not as yet securely stored as it has not been processed by the thread and acknowledged by the storage media 50, 60. A second pointer is maintained at the position in the buffer where the latest processed and acknowledged stored data may be found. It is this pointer, having a corresponding position in the backup buffer that determines when data can be discarded.

The extents of an identified file may be arranged in order of receipt prior to further processing for deduplication. So, file data for deduplication may be dequeued by maintaining a plurality of output buffers where the individual files are accumulated and subsequently released for processing. This may permit selective processing for deduplication depending on the file type, user, or the like.

Figure 4:
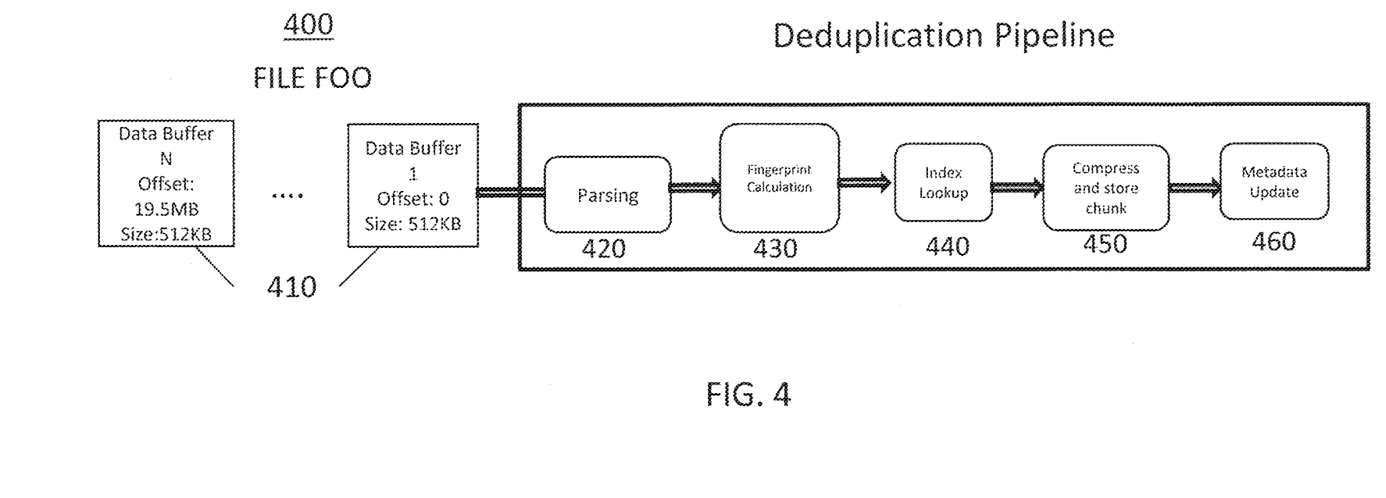

In an aspect, the de-duplication process may be described using the example shown in FIG. 4 where a File Foo 400 (total of 20 MB in size) that may be comprised of 512 KB data extents 410 is ingested into the deduplication pipeline to perform deduplication process. The data extents which have been accumulating in the NVRAM input buffer may be ingested from the input buffer to a deduplication pipeline sequentially, based on the order of their logical file offset within a file or based on the arrival temporal sequence, or the like. File systems may make changes to a cached version of the file and then write the file back to the storage medium when the file session is closed. Consequently, the files received by the deduplication process may comprise mostly "old" data extents, but may have new data in some data extents which may be unique (novel) and which need to be identified and stored. The "old" (unmodified) data is identified in the deduplication process and only a reference or pointer to the location where the data is stored is maintained in the metadata.

Often, large storage systems are used in virtualized environments. Since many users may access the storage system and some form of allocation of processing time and memory resources between users is needed to avoid degradation of response times for each application. Virtualization may be controlled by a "hypervisor" which performs the resource allocation and isolation between users and the hypervisor may partition or fragment a NFS write request data payload into, for example, a plurality of 512 KB or smaller data payloads (if request size >512 KB) by an appropriate transmission protocol (TCP as an example).

Requests from a particular client or guest application may not be received consecutively by the storage server (that is, they may be interleaved with other requests), but the requests related to a particular may file exhibit temporal locality. That is, the whole file may be written to the storage system in an operation which may appear to the user to be a single atomic operation even if there are some other files or data being transferred contemporaneously. The data transmission over the channel may be interleaved with other users so as to avoid blockage, for example. The storage server may reassemble the segments of a file as required to perform storage functions, including deduplication. In contrast, a block storage application may transmit data in small increments, such as a page, which might be 512 B, 2 KB or the like.

The virtualization system may be described as having a "hypervisor." A person of skill in the art would recognize that a variety of proprietary systems are available with comparable and evolving characteristics and the use of the term "hypervisor" is not intended to be limiting.

Each NFS request may include a unique file handle or other identification (which can be used to map to the absolute pathname or metadata of the file) and information about the request. For example, a write request may contain a file offset, a length and a data payload. The file description information is stored in the metadata. The file metadata may be used when performing deduplication and the metadata are updated to account for the results of the deduplication and compression processes.

The hypervisor may mount the NFS volume, which may be exported as a share, and use it as NAS datastore. The datastore may be understood broadly to be a container (or partition) that the hypervisor can use to create and store the files of the virtualized user application. A hypervisor may issue synchronous write requests in this environment and delays by the storage system (latency) in acknowledging the secure receipt of the command and payload (e.g., the data) reduces the system throughput. That is, the operation may be stateless and further operations are paused until completion of a request, which may be, for example, a remote procedure call (RPC) as is known in the art. The hypervisor may communicate with the storage system through a network which may operate in accordance with the Internet protocol or other data transmission protocol. The system may operate by maintaining queues at various points in the storage path so as to have data immediately available on which to operate. However, unless the data in the queue is already securely stored, the completion of the requested operation may delay performance of further steps in a user processing application.

Each virtual machine (guest) managed by the hypervisor may be represented as a set of files in a directory in a datastore. The storage system location associated with each guest is a set of files within the guest directory. The operations performed on the storage allocated to the guest can be known types of file operations.

When an extent of data, which may be an entire file, or a section of a large file is dequeued from the NVRAM buffer, the data may be broken into chunks (referred to as parsing the data 420) of a predetermined size or of a variable size to perform deduplication. Depending on the parsing algorithm used, this operation could consume significant CPU resources. Fingerprint calculation 430, which may be, for example, a cryptographic hash, may be performed on each chunk to generate an identifier. The amount of CPU resources could vary depending on the algorithm used to calculate the fingerprint and whether the implementation uses hardware or software. To determine if a chunk is a duplicate of data already stored in the deduplication repository, an index lookup 440 is performed on previously determined identifiers using the identifier for each chunk. Where the newly computed identifier is not found in the lookup, the chunk is novel and needs to be stored in the memory array 50, 60. The novel chunk may be compressed and then stored in the memory array 450 and metadata created or updated 460.

Compression requires CPU or specific hardware resources and storing the chunk involves I/O resources for write operations and metadata updates. Once a novel chunk is successfully stored, the deduplication identifier index and the file block map need to be updated to store information regarding the location of the chunk in the memory array memory space. Updates may need to be performed on a number or metadata entities, indexes or the like. A variety of compression algorithms are known to persons of skill in the art and may be selected based on user configuration, file type, or data type, or by performing more than one compression algorithm and comparing the results, or by using a heuristic such as the Shannon Entropy to estimate the compressibility. Such data compression techniques are described in U.S. Ser. No. 14/481,102, filed on Sep. 9, 2014, entitled "System and Method of Data Storage in Flash Memory," which is commonly assigned and which is incorporated herein by reference.

The efficiency of a file deduplication process may depend on selecting an appropriate chunk size, which may be variable, and correcting misalignment of bytes so that chunk boundaries are compatible with the underlying data structure of the file. The boundaries between blocks of a fixed size may be determined by chunking algorithms, as are known in the art, such as Rabin fingerprinting, or n-graph hashing. Hashing to determine chunk size or chunk boundary alignment is a dynamic process where the hash values are used during the chunking process may not be the same as used in the main deduplication process where a cryptographic hashing function may be used. Alternatively, a fixed chunk size may be chosen. For block data, a fixed chunk size, typically a page (e.g. 4 kB), may be used.

Where the properties of a file are generally known, the file identifier may be used to select between chunking algorithms and parameters. Alternatively, the results of processing files of a particular type may be used to develop a heuristic so that subsequent files may be processed efficiently. The chunk sizes may vary between, for example, 3 kB or less and 64 kB or more, while file sizes may vary from a small size exemplified by the *.lck file type to very large image or video files. In a general purpose storage system, the types of files being ingested may therefore have substantially differing characteristics. The chunk size may be adaptively controlled for a file or a file type so as to make most effective use of the computing and memory resources.

Each chunk may be processed using a cryptographic hash function, which may be a Secure Hash Algorithm (SHA) which is intended to uniquely identify the bit pattern of the chunk. Since the cryptographic hash value (message digest) is unique, it may represent the contents of the chunk (message) for comparison with later received chunked data so as to determine if the later received data is a duplicate of the already stored data. A hashing algorithm processes an arbitrary-length message and results in a fixed length message digest. This is considered a one-way function, as the original message (data) content cannot be determined based on the message digest. The SHA gets the name "secure" since the algorithm was designed to make finding the original data from the hash value is computationally impracticable. Here the term refers to the secrecy of the data stored rather than the permanence of the storage. The SHA is a cryptographic hashing algorithm specified by the National Institute of Standards and Technology (NIST) in the Federal Information Processing Standards Publication 180 (FIPS PUB 180). Hardware implementations of this processing are available in the INTEL architecture processors, for example, although this is not a limitation on the approach that may be used as other algorithms may result in a similar operation. Where a hash algorithm does not provide the same level of uniqueness as a cryptographic hash, a match of the hash to the database of deduplicated data may need to be confirmed by actually comparing the data to be written to the stored unique data that is identified by the hash value.

Each time that a chunk of data is processed by hashing for de-duplication, the de-duplication hash table needs to be searched to determine if there is a match. If no match is found, then there is no data chunk having the same data that has already been stored and the new data is novel. The novel data chunk needs to be stored to the memory array 50 or 60 and the metadata describing the data location stored in a table. The primary location of such a hash table may be either in the channel 30 itself or in the storage array 50, 60, with the understanding that the table contents may be mirrored in an independent portion of the system (e.g., the other channel or another memory array).

When in-line deduplication is being performed, the hash-table-look-up may be performed, for example, in the data channel 30 prior to storage of the data in the memory array 50, 60. When a match between a computed hash and a hash value representing a de-duplicated data extent is encountered, the new data is not novel and need not be stored. But, the metadata in the table containing the hash values needs to be updated so as to acknowledge the duplicate data and to redirect any request for the duplicated data to the previously stored data that is the same data. Since the user refers to the data by the file handle, Mode, or other logical address or tag, a mapping between the user data reference and the actual storage location needs to also be updated. Most processes described herein use a level of indirection in addressing to facilitate communication between system elements, efficiently perform look up operations and table management and the like. Such housekeeping operations may be presumed.

Updating of look-up tables, metadata or other data structures may be often be more efficiently performed as batch processes as many algorithms are more efficient for large data sets. Also, the selection of data extents to be hashed may be variable and the data being hashed may be broken into a plurality of extents that may be separately processed. The files being subject to de-duplication processing may have extents of 20 MB or greater. Such a file may be representative of a persistent desktop in a virtual desktop infrastructure. However, the extents of the file that eventually are identified as being de-duplicable may be smaller in size if the file has been modified. By using variable-length chunk processing, the changed data may be separated from the unchanged data and only the changed data that is not otherwise replicated (novel data) need be stored. This may considerably reduce the write load on the memory array 50, 60. Note that the memory arrays 50, 60 may be the same type of memory array and may be redundant, or only one memory array, 50 or 60, may be used depending on the non-volatile memory capacity required. Further memory arrays may also be attached by networks or in direct communication with the gateway, for example, to increase the overall memory capacity.

The new (novel) data may be compressed before storage, further reducing the memory requirements, if the data had not previously been compressed by the user. As compression is usually performed after the de-duplication process, data that has already been stored represents the compressed data and the compression step would only be done for new (novel) data to be stored.

Variable-chunk-length de-duplication, when used in backing up data, is computationally intensive, as the association of data blocks with a file may be difficult and a significant amount of computation may be needed to identify the boundaries between different blocks. Here, where the data received for a file has temporal locality, even if a number of files are interleaved, the extent of each file segment may be assumed to be governed by the transport protocol and a chunk sized determined accordingly.

As shown in FIG. 4, the segments of such a file may be assembled in, for example 512 KB extents and sorted by the offset in the file of each of the extents. The extents may not be contiguously received by the processing channel as a virtualized system may permit the interleaving of communications arising from other clients or applications. When a sufficient number of extents have been received, which may be the whole file, the data in the input buffer 65 may be de-queued in sequential order by the de-duplication application running on the processor or controller 80 and the data processed, de-duplicated as appropriate, and novel data stored in the memory array 40. Associated with the controller may be volatile or non-volatile working memory (not shown), which may be shared with the buffer 65.

In an example, the changes that are to be made to the hash table and the metadata may be stored temporarily in a log file in both the non-volatile buffer 65 of the processing channel (e.g. 70A) and in the corresponding buffer of the companion channel (70B). When sufficient changes have occurred, or a predetermined time interval has elapsed, the log file may be processed so as to update the hash table and the metadata. Both the hash table and the metadata may be redundantly stored. Dequeueing of data from the input buffer 65 may be performed whenever the controller 80, acting as a de-duplication engine, is capable of accepting data. The data may be selected on a first-in first our basis (FIFO), be reassembled file extents, concatenated smaller files, or the like. The extent to be processed for de-duplication may be sized on the basis of the sub-extent sizes to be hashed. Only new or changed data is stored, and the changes to the metadata, and the hash table may be stored temporarily so that a batch update of the metadata and hash table may be performed periodically. The updates may be performed after a time period or after a predetermined number of changes have been accumulated. During the de-duplication, data hashes may be compared against the new hashes so as to eliminate duplicate data that has been recently received or to respond to a read request for data that has recently been stored. New writes that modify data that is still in the NVRAM buffer may overwrite the data, and the modified data is mirrored to the partner channel. In an aspect, hashes that have not as yet been used to update the hash tables when batch updating is used, may be compared with a new hash so as to consolidate the data prior to performing the updates.

In an aspect, during the time that the data of a file is stored in the input buffer 65, a read request for an extent of the file that is stored in the input buffer 65 may be returned to the user without accessing the memory array 40.

In this discussion, we note that data to be stored in a block format may be separately processed, although the same gateway channels may be used. The block data may be stored in the input data buffer 65 and mirrored, the receipt of a write command with a data payload of one or more blocks may be promptly acknowledged, subsuming the subsequent processing steps. Block data may be processed for deduplication in a fixed block size or a small number of block sizes and storing and mirroring an extent of data may not be needed, except for providing a rapid acknowledgement of the execution of commands, as the secure storage requirements also apply to block data storage. The block data may be identified, for example, by being communicated using a SAN protocol and being characterized by a LUN and logical block number. The block protocol processing may be performed by the channel processors 70-A, B or the data may bypass the channel processor or be passed through the channel processor 70 for processing by the memory array 50, 60. Indeed, the entire channel processor pair 70 A, B may itself be part of the same equipment as the memory array 50, 60. The division of functions between the various hardware elements of the system is convenient for discussion and may be an embodiment of the present concept, but this is not a limitation.

Not all of the files related to a user may benefit from de-duplication. Files that are small, are often modified, or have a short lifetime, may incur more space to store and consume more processing resources than is desirable. In an example, a file type *.lck is a file type representing a control file to synchronize access in a hypervisor or database environment. This type of file represents that state of a file where the file is being accessed by the user and the file is sharable with other users. To prevent a loss of file integrity, only one user is ordinarily permitted to modify the file at any time. Part of or all of the file may be locked, and the lock may be, for example, for one operation, or be a lock of the whole file until an event occurs that causes the lock to be released. Such an event may be another user requesting access to the file. These coordination files may be short in extent or in average lifetime.

Metadata for a stored file may be allocated in chunks, which may be, for example, 1 kB in length. For a short file such as a *.lck file the amount of metadata needed to completely characterize the properties of the file may be smaller than 1 kB, and the entire contents of the file may be stored in the allocated metadata chunk. Hence, files of the *.lck type need not be de-duplicated and may not be compressed, reducing the processing load. When the *.lck file is accessed, the metadata lookup returns the file contents directly without referencing other storage locations, since the *.lck file was not stored as data in the storage memory. *.lck files or similar files are usually of a transient nature, and while the integrity of the information must be maintained, committing the data to the storage memory may be inefficient. If the *lck files are identified upon receipt by the active channel, the receipt thereof may be acknowledged to the user as soon as the metadata has been updated, and the *.lck file may not be sent to the backup buffer. Since the *.lck file is a procedural function, the rapid acknowledgement of the receipt of the file contributes to improved performance of the using application.

*.lck files may be subject to predetermined processing steps and may be identified by their file extensions or other metadata attributes.

Other file types may be amenable to such a processing regime. In an aspect, the suitability of a file type to simplified processing may be determined by a look-up table of known file-type extensions that have suitable characteristics or by determining the relative frequency of de-duplication by file name or file extension.

Since the actual secure storage of the data in the memory system involves the writing of the data to be stored and any associated metadata or metadata updates to the non-volatile memory 50, 60, the data that was received by the input buffer 65 and backed up in the backup buffer needs to be retained in the gateway until such time as the storage process has been completed. Processes such as metadata updates of various kinds, including deduplication metadata may be performed periodically rather that continuously, while the data being stored, due to the larger quantity involved may proceed in a streaming fashion from the gateway to the storage memory. Metadata updates, for example, that have not as yet been processed, may be considered securely stored if the metadata involved has been stored in a buffer that is otherwise securely backed up. When the term "securely stored" is used, the implication is that whatever information that is needed to recover the data has been stored in a manner that permits such recovery in case of a failure of one of the channels.

Since the throughput of the various threads (e.g., a thread having deduplication with variable chink size, compression and encryption, or a thread storing previously encrypted data which is being stored in page-sized chunks without deduplication or compression) may vary considerably, the management of the input buffer and backup buffer may include management of sub-buffers that are managed in accordance with a policy. A management policy may take account of the current contents of the buffer and the processing throughput for each thread.

A method of operating a redundant, high-availability gateway of a memory system comprising at dual channel active-active controller includes the steps of:
  receiving commands and payload data from a user at a first controller;
  storing the commands and payload data in an input buffer comprising NVM;
  sending the commands and payload data to a NVM backup-buffer in the second controller;
  receiving an acknowledgement of receipt of the commands and payload data from the second controller;
  acknowledging the receipt of the commands and payload data to the user;
  securely storing the payload data in accordance with the commands; and
  after performing the step of securely storing, purging the commands and payload data from the input buffer and the backup buffer.

In another aspect, a method of operating a redundant, high-availability gateway of a memory system comprising a dual channel active-active controller includes the steps of:
  receiving data from a first controller;
  storing the data in a NVM backup buffer in a second controller;
  acknowledging the storage of the data received from the first controller;
  monitoring the first controller to determine if a failure event has occurred;
  processing the data in the backup buffer using the second controller;
  configuring the backup buffer to be a temporary input buffer for data that has been rerouted the user to the second channel;
  purging the backup buffer when the data in the backup buffer has been securely stored; and
  purging the data in the temporary input buffer when the data in the temporary buffer has been securely stored.

While the buffers in each channel may be described as having different functions such as input buffer, backup buffer, temporary buffer, the non-volatile memory in each channel may be a single device in each channel where the allocation of storage space is made on a functional basis.

A method of selective deduplication of data to be stored may include the steps of:
  a. receiving commands and payload data from a user through a communications interface;
  b. temporarily buffering the received data and commands in a non-volatile memory (NVM) and mirroring the buffered data and commands in redundant non-volatile memory (NVM);
  c. using information associated with the commands or the data to identify data blocks associated with a file and to determine the order of the data blocks;
  d. providing information to a processor as to the size of a data block comprising data associated with the file;
  e. dequeueing a data extent corresponding to the file when it has reached a predetermined size;
  f. parsing the data extent into chunks and computing a cryptographic hashes as data identifiers;
  g. comparing the data identifiers with a data structure having data identifiers of currently stored data to determine if a chunk of the chunks of the data block are not stored in a memory system;
  h. linking the metadata of a chunk that has been stored with the metadata identifying the location of the stored chunk;
  i. storing a chunk that has not been stored (novel) in the memory system in the memory system; and
  j. generating metadata to identify the location of the stored novel data.

In an aspect, the method further comprises:
  a. determining whether the novel chunk to be stored in the memory system should be compressed based on one of a file type, a heuristic or a policy; and
  b. compressing the novel chunk prior to storage in the memory system.

In yet another aspect, the method further comprises acknowledging the completion an operation associated with a write command as soon as the received command and data has been acknowledged in the backup buffer, where the backup buffer continues to be operable when the other channel has failed.

In still another aspect, the method comprises identifying files that are not to be subject to the de-duplication process, where the identification is based on file size or file type and, where the amount of data to be stored is less than the size of a metadata block, storing the file data as part of the metadata block.

In an another aspect, the method comprises
  a. identifying files of less than a predetermined size and forming a data block from the files;
  b. providing information to the processor as to the current size of the data block;
  c. operating the processor so as to dequeue the data block when it reaches a predetermined size or age; and
  d. performing de-duplication of the data block.

When methods are described, and a listing of steps to be performed is given, it should be understood that the ordering of the steps is illustrative and steps the method may be combined, omitted, reordered, repeated or the like without departing from the teachings of the disclosure. Similarly, in the claims, the use of letter or numerical identification of clauses is for clarity in description and does not imply a restriction on the sequence of performance of the steps in the method.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A data channel for a storage system, comprising:
a plurality of non-volatile buffers, each buffer communicating with an external communications interface, and at least two non-volatile buffers of the plurality of non-volatile buffers in mutual communication;
a plurality of processors, each processor associated with a non-volatile buffer of the plurality of non-volatile buffers;
wherein, (a) a first non-volatile buffer of the plurality of non-volatile buffers is configured to receive information comprising a command with a payload through the external communications interface, store the received information in the first non-volatile buffer and transmit the command and the payload to a second non-volatile buffer such that the received information and command and information is stored in the first and the second non-volatile buffers;
(b) a first processor of the plurality of processors associated with the first non-volatile buffer is configured to acknowledge an execution of the command associated with the received information to a user when the received information has been stored in the second-non-volatile buffer;
(c) the first processor is configured to process the received information and to associate information from received payloads using a file identifier so as to form a data block;
(d) the first processor is configured to dequeue the data block when (i) the data block has reached a predetermined size or (ii) the first processor resources are available to process the block; and;
(e) the first processor configured to determine whether the data block has already been stored in a data storage system.

2. The data channel of claim 1, wherein the command further comprises metadata for the command or the information.

3. The data channel of claim 1, wherein the predetermined size of the data block is one of: (i) a maximum predetermined size, or (ii) all of the payloads of a file associated with a write command.

4. The data channel of claim 1, wherein the first processor is configured to de-duplicate chunks of data of the data block and to store chunks of data that are not already stored.

5. The data channel of claim 4, where the data to be stored is compressed after de-duplication and prior to storage in a memory array.

6. The data channel of claim 1, wherein metadata associated with a command received by the first non-volatile buffer is used to assemble a plurality of received data extents into the data block.

7. The data channel of claim 1, wherein metadata associated with a command received by the first non-volatile buffer is used to selectively exclude a file from de-duplication and to store the file as a component of file metadata.

8. The data channel of claim 7, wherein the file metadata identifies the file as a *.lck file type.

9. The data channel of claim 7, wherein the file metadata identifies the file as being of a size that can be stored as the file metadata.

10. A method of selective deduplication of data to be stored in a non-volatile memory comprises:
providing redundant data channels, a first data channel of the redundant data channels further comprising:
a network communication interface;
a second communication interface to a non-volatile memory system;
a third communications interface to another a second data channel of the redundant data channels;
a processor configured to communicate with the network communications interface, the second communications interface and the third communications interface;
a non-volatile buffer memory in communication with the processor;
wherein the first data channel is configured to perform the steps of:
a. receiving commands and payload data from a user through the network communications interface;
b. temporarily storing the received data and commands in the non-volatile memory and sending the received data and commands to the non-volatile memory of the second data channel; and,
selecting between one of:
i. acknowledging an execution of the received command to a user when the received payload data has been stored in a non-volatile buffer of the second data channel; or
ii. acknowledging an execution of the received command to a user when the received payload data has been stored in metadata of the second data channel;
wherein the selection between steps (i) and (ii) is based on at least one of:
a file type;
a file size; or
a transmission protocol of the network communications interface.

11. The method of claim 10, further comprising:
c. using information associated with the commands or the data to identify data extents associated with a same file;
d. providing information to the processor as to the size of a total extent of the data comprising data associated with the same file;
e. dequeueing a data block from the non-volatile memory corresponding to the same file when the received data for the file has reached a predetermined size or the total extent of the data of the file;
f. performing de-duplication of the data block by:
parsing the dequeued data block into chunks of data and computing a cryptographic hash data identifier for each chunk;
comparing each data identifier with a data structure having data identifiers of currently stored data to whether the chunk has been stored in the non-volatile memory system; and one of:
linking the metadata of a chunk that has previously been stored with the metadata identifying a storage location of the stored chunk;
storing in the non-volatile memory system the chunk of data that has not been stored in the non-volatile memory system.

12. The method of claim 11, further comprising:
determining whether the chunk of data to be stored in the non-volatile memory system should be compressed based at least one of a file type or a heuristic; and
compressing the chunk of data prior to storage in the non-volatile memory system.

13. The method of claim 10, further comprising:
identifying files of less than a predetermined size and forming a data block from the files;

operating the processor to dequeue the data block from the non-volatile buffer when it reaches a predetermined size or age; and performing de-duplication of the data block.

14. The method of claim 10, wherein the file type has been identified as a *.lck file.

15. The method of claim 10, wherein the file type has been identified as control file and not a data file.

* * * * *

UNITED STATES PATENT AND TRADEMARK OFFICE
CERTIFICATE OF CORRECTION

PATENT NO. : 9,817,602 B2
APPLICATION NO. : 14/938238
DATED : November 14, 2017
INVENTOR(S) : David Chaw et al.

It is certified that error appears in the above-identified patent and that said Letters Patent is hereby corrected as shown below:

In the Claims

In Column 19, Claim 1, Line 16, after "such that the received" delete "information and".

In Column 20, Claim 10, Line 6, after "communications interface to" delete "another".

Signed and Sealed this
Twenty-fourth Day of April, 2018

Andrei Iancu
*Director of the United States Patent and Trademark Office*